United States Patent [19]

Matviya et al.

[11] Patent Number: 4,708,853
[45] Date of Patent: Nov. 24, 1987

[54] MERCURY ADSORBENT CARBON MOLECULAR SIEVES AND PROCESS FOR REMOVING MERCURY VAPOR FROM GAS STREAMS

[75] Inventors: Thomas M. Matviya; Robert S. Gebhard, both of Pittsburgh; Michael Greenbank, Monaca, all of Pa.

[73] Assignee: Calgon Carbon Corporation, Pa.

[21] Appl. No.: 729,010

[22] Filed: Apr. 30, 1985

Related U.S. Application Data

[63] Continuation of Ser. No. 548,472, Nov. 3, 1983, abandoned.

[51] Int. Cl.$^4$ .................. B01J 20/02; B01D 19/00; B01D 53/02
[52] U.S. Cl. .......................... 423/210; 55/72; 55/75; 502/417
[58] Field of Search .............. 423/210 R, 210 M; 55/72, 75, 389; 502/417

[56] References Cited

U.S. PATENT DOCUMENTS

| | | | |
|---|---|---|---|
| 3,193,987 | 7/1965 | Manes et al. | 55/72 |
| 3,194,629 | 7/1965 | Dreibelbis et al. | 23/2 |
| 3,374,608 | 3/1968 | Manes | 55/72 |
| 3,803,803 | 4/1974 | Raduly et al. | 55/72 |
| 3,833,514 | 9/1974 | Wennerberg et al. | 502/417 X |
| 3,876,693 | 4/1975 | Kasai et al. | 55/68 |
| 3,884,830 | 5/1975 | Grant | 502/429 |
| 4,101,631 | 7/1978 | Ambrosini et al. | 423/210 |
| 4,261,709 | 4/1981 | Itoga et al. | 55/389 X |

OTHER PUBLICATIONS

Collins, "Where to Use Molecular Sieves", Chem. Eng. Progress, vol. 64, No. 8, 8/68.

Primary Examiner—John F. Niebling
Assistant Examiner—Nam X. Nguyen

[57] ABSTRACT

The instant invention is directed to a carbon molecular sieve, having a nitrogen diffusivity of less than $2600 \times 10^{-8}$ cm$^2$/second, impregnated with from about 0.005 to about 15 percent, by weight, of a mercury reactive material.

The instant invention is also directed to a process for removing mercury vapor from gas streams which comprises passing a gas stream containing mercury vapor into contact with a carbon molecular sieve, having a nitrogen diffusivity of less than $2600 \times 10^{-8}$ cm$^2$/second, impregnated with from about 0.005 to about 15 percent, by weight, of a mercury reactive material.

12 Claims, 10 Drawing Figures

MERCURY ADSORBENT CARBON MOLECULAR SIEVES AND PROCESS FOR REMOVING MERCURY VAPOR FROM GAS STREAMS

This is a continuation of application Ser. No. 548,472, filed Nov. 3, 1983, now abandoned.

BACKGROUND OF THE INVENTION

Mercury vapor has been removed from gas streams by a number of different adsorbents. See for example, U.S. Pat. No. 3,194,629 describing activated carbon impregnated with potassium triiodine or sulfur; U.S. Pat. No. 3,876,393 describing activated carbon impregnated with sulfuric acid; U.S. Pat. No. 3,193,987 describing activated carbon impregnated with silver or copper salts; and U.S. Pat. No. 4,101,631 describing zeolites containing elemental sulfur. Generally, these adsorbents are only effective when relatively large concentrations of mercury are present and, each adsorbent has a lower limit, below which, mercury vapor is either inefficiently adsorbed or not adsorbed at all.

It has been discovered that carbon molecular sieves impregnated with a mercury reactive material are effective adsorbents especially of very low concentrations of mercury vapor. It was also found that carbon molecular sieves impregnated with sulfur are less adversely affected by water and temperature than the prior art adsorbents.

DESCRIPTION OF THE INVENTION

The instant invention is directed to a carbon molecular sieve, having a nitrogen diffusivity of less than $2600 \times 10^{-8}$ cm$^2$/second, impregnated with from about 0.005 to about 15, preferably 0.01 to 10, most preferably 3 to 7, percent, by weight, of a mercury reactive material.

The instant invention is also directed to a process for removing mercury vapor from gas streams which comprises passing a gas stream containing mercury vapor into contact with a carbon molecular sieve, having a nitrogen diffusivity of less than $2600 \times 10^{-8}$ cm$^2$/second, impregnated with from about 0.005 to about 15 percent, by weight, of a mercury reactive material.

Carbon molecular sieves impregnated with from 0.005 to 15 weight percent, preferably 0.01 to 10 weight percent, most preferably from 3 to 7 weight percent of a mercury reactive material are useful adsorbents for removing mercury vapor from gas streams, especially at low level mercury vapor concentrations. The carbons are especially effective at mercury vapor concentrations, P, at a given pressure and temperature, defined as $P < (4 \times 10^{-6}) \times P_s$, preferably $P < (1 \times 10^{-6}) \times P_s$, where $P_s$ is the mercury vapor saturation pressure at the aforementioned given pressure and temperature.

Carbon molecular sieves are porous substrates with an open-network structure of controlled molecular dimension which may be used to separate mixtures of small molecules from larger molecules, based on a difference in molecular size or a difference in diffusivity rates. U.S. Pat. No. 3,884,830, which is hereby incorporated by reference, describes the manufacture of an activated carbon molecular sieve.

Carbon molecular sieves have been prepared from a variety of substrates by a number of different manufacturing processes. Examples include anthracite coal (U.S. Pat. No. 3,222,412); coke or coconut shells, elevated temperatures and pore blocking by carbon deposition (U.S. Pat. No. 3,801,513); vinylidene chloride copolymers (U.S. Pat. No. 4,046,709); and bituminous coal or coconut shells, elevated temperatures and an inert atmosphere (U.S. Pat. No. 2,556,859). The preferred substrates are coal and nut shells. Carbon molecular sieves may also be defined in the present invention as having a nitrogen diffusivity of less than $2600 \times 10^{-8}$ cm$^2$/second, preferably $1 \times 10^{-8}$ cm$^2$/second to $2600 \times 10^{-8}$ cm$^2$/second, more preferably $10 \times 10^{-8}$ cm$^2$/second to $2600 \times 10^{-8}$ cm$^2$/second, and most preferably $10 \times 10^{-8}$ cm$^2$/second to $300 \times 10^{-8}$ cm$^2$/second, prior to impregnation.

Examples of the mercury reactive materials which may be used include oxidizing agents and amalgamating metals. Examples of oxidizing agents include: S; $FeCl_3$; sulfides, such as CuS, AgS; $KI_3$; $KIO_3$; NaOCl; $MnO_2$ and $PbCl_2$. Examples of metals include: gold, silver, tin and copper.

The removal of mercury vapor from the aforementioned gas streams with the carbon molecular sieves may be accomplished in any manner available to the skilled artisan. Generally, the gas stream is contacted with a quantity of the mercury reactive material impregnated carbon molecular sieves. This may be accomplished in one or more adsorbent beds, through which the mercury vapor laden gas is passed. There may also be employed additional mercury adsorbents, such as mercury reactive material containing zeolite and/or the activated carbon described in U.S. Pat. No. 3,194,629. These adsorbents are commercially available from Union Carbide Corporation and Calgon Carbon Corporation respectively.

Gas streams contemplated to come within the scope of this invention include: natural gas streams; industrial gas streams contaminated with mercury; such as hydrogen gas from a chlor-alkali plant, furnace stack gases, battery disposal incinerator gases and the like; air, hydrocarbon gases, carbon dioxide, carbon monoxide, oxygen, nitrogen and the like.

Any carbon molecular sieve may be used. Examples include CMX-1, GRC-II and MSC-V, manufactured by Calgon Carbon Corporation. CMX-1 is a non-activated carbon molecular sieve. GRC-II and MSC-V are slightly activated carbon molecular sieves.

The carbons may be impregnated with mercury reactive material in any convenient manner. For example, solid elemental sulfur and granular carbon molecular sieves may be admixed and heated at about 150° C. Additional heating at about 150° C. or above for from 10 to 90 minutes causes complete impregnation of the sieve pores by the sulfur. Alternatively, the sulfur may be dissolved in a solvent such as carbon disulfide, and the solvent contacted with the high energy carbon. Typical methods include spraying, dipping, and the like. Excess solution is removed by decanting or filtering and the sieve is dried. Drying may be accomplished at room temperature, or at elevated temperatures. Vacuum may also be employed to aid in removing solvent.

The carbons used in the examples are described in Table I.

TABLE I

| Carbon | Hg Vapor Removal Limit ($\mu^3/m^3$) 20–25° C. Ambient Pressure | Nitrogen Diffusivity ($\times 10^{-8}$ cm$^2$/second) |
|---|---|---|
| BPL*[a] | .071 | 2786 |
| Bergbau[b] | .025 | 2.14 |
| CMX-1[a] | .0016 | 59.3 |
| MSC-V[a] | .004 | 2527 |
| GRC-II[a] | .0018 | 2200 |
| Babassu Nut | .0040 | 170 |

*Comparison (not a molecular sieve)
[a]Manufactured by Calgon Carbon Corporation.
[b]Manufactured by Bergbau Forshung.

EXAMPLES

Example 1

Preparation of CMX-1

Coconut char was fed to an enclosed drive-belt furnace (22-inch belt width) at 30 pounds per hour. The furnace temperature was 1800° F. and the furnace residence time was 30 minutes. A constant nitrogen purge, countercurrent to feed flow, was maintained at 25 standard cubic feet per minute (SCFM). The atmosphere was maintained at less than 500 ppm oxygen.

To calculate a test gas (e.g. oxygen, nitrogen, etc.) diffusivity value, the dead volume of a sample cell containing about 10 grams of carbon sieve was determined by helium expansion. The test gas was then expanded into the re-evacuated sample cell from a one-liter reference cell. Knowing the dead volume, adsorption (loading) of any test gas was monitored by the change in pressure of the system. These values combined with an equilibrium loading value calculated for a sieve sample after one hour (at STP) allowed the determination of a relative loading value ($L_t/L_e$). $L_t$ was the test gas loading value of a sieve sample at a given time, for example 30 seconds, and $L_e$ was the test gas loading value of a sieve sample at equilibrium. The gas diffusivity value (D) of a sieve sample was then calculated for the test gas by solving the simplified equation for diffusion into a sphere:

$$L_t/L_e = 6(Dt/\pi R_0^2)^{\frac{1}{2}} - 3Dt/R_0^2$$

where
D = gas diffusivity value
t = time in seconds
$R_0$ = mean particle radius of a carbon sieve (0.05125 cm)

See: R. L. Dedrick and R. B. Beckmann, "Kinetics of Adsorbtion by Activated Carbon from Dilute Aqueous Solution", *Physical Adsorption Processes and Principles*, L. N. Canjar and J. A. Kostecki, eds., Vol. 63, American Institute of Chemical Engineers, New York (1967); P. L. Walker, Jr., L. G. Austin and S. P. Nandi, "Activated Diffusion of Gases in Molecular Sieve Materials", *The Chemistry and Physics of Carbon*, P. L. Walker, Jr., ed., Vol. 2, Marcel Dekker, Inc., New York (1966) and J. Crank, "The Mathematics of Diffusion", 2nd Ed., Clarendon Press, Oxford (1975).

Determination of oxygen and nitrogen diffusivity values allowed for calculation of the oxygen/nitrogen selectivity ratio: $S = DO_2/DN_2$.

A carbon sieve having the following physical characteristics was produced:

| | | |
|---|---|---|
| (A) | oxygen diffusivity $\times$ $10^{-8}$ cm/sec$^2$ | 693 |
| (B) | oxygen/nitrogen selectivity ratio | 7.19 |
| (C) | oxygen equilibrium volume STP gas cc/g carbon | 6.7 |
| (D) | oxygen equilibrium volume STP gas cc/cc bed volume carbon | 4.3 |
| (E) | apparent density g/cc | 0.64 |

Example 2

The carbon molecular sieve of Example 1 was mixed, at 150° C., with a sufficient quantity of sublimed elemental sulfur to provide a 5 percent (w/w) sulfur loading until the mixture was uniform. This mixture was then heated at 150° C. for 90 minutes.

Figure 1:
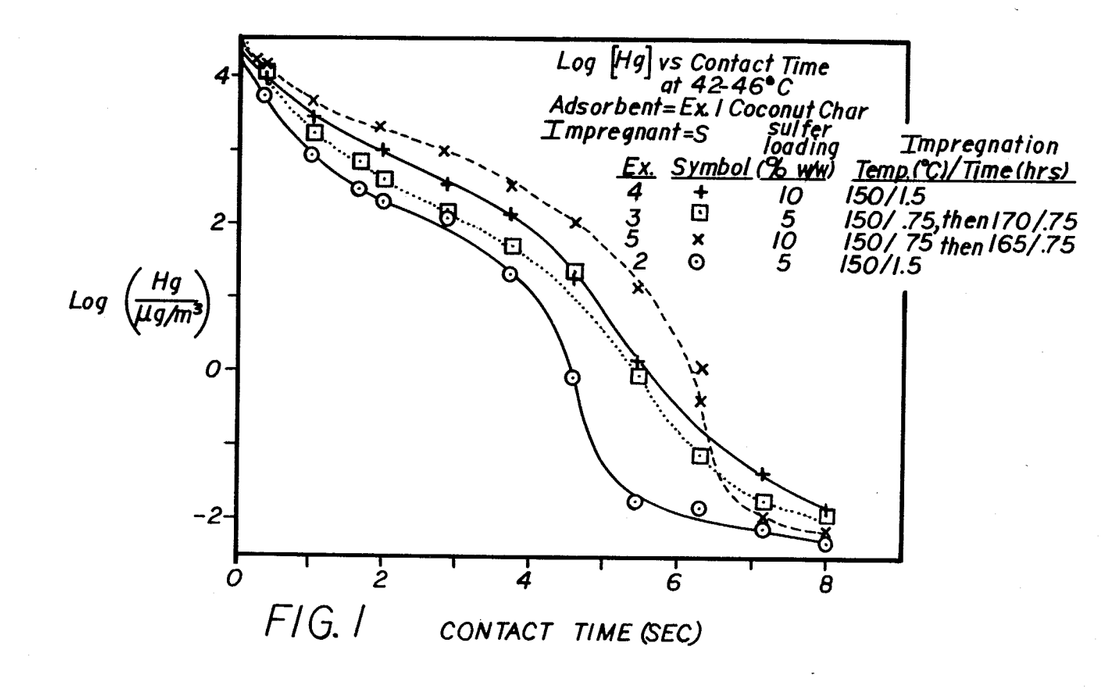
FIG. 1 is a multicurve plot of the measured performance data obtained per the present invention. Coordinates presented are the log of the mercury vapor concentration during adsorption, plotted against the contact time for the mercury vapor containing airstream, for a specific candidate mercury adsorbent, (CmX-1) as produced in Example 2, 3, 4 and 5 of the specification.

A dry air stream, having an inlet mercury concentration of 17,900 $\mu g/m^3$ was passed through a column containing the above-described sulfur impregnated CMX-1, at a linear velocity of 23 ft/min. The column and inlet air stream were maintained at a temperature of 42° C. and ambient pressure. A contact time of 8 seconds was sufficient to reduce the mercury vapor concentration to 0.005 μg/m$^3$. The results are presented in FIG. 1.

Example 3

The carbon molecular sieve of Example 1 was mixed, at 150° C., with a sufficient quantity of sublimed elemental sulfur to provide a 5 percent (w/w) sulfur loading until the mixture was uniform. This mixture was then heated at 150° C. for 45 minutes and at 170° C. for an additional 45 minutes.

A dry air stream, having an inlet mercury concentation of 30,800 μg/m$^3$ was passed through a column containing the above-described sulfur impregnated CMX-1, at a linear velocity of 23 ft/min. The column and inlet air stream were maintained at a temperature of 46° C. and ambient pressure. A contact time of 8 seconds was sufficient to reduce the mercury vapor concentration to 0.012 μg/m$^3$. The results are presented in FIG. 1.

Example 4

The carbon molecular sieve of Example 1 was mixed, at 150° C., with a sufficient quantity of sublimed elemental sulfur to provide a 10 percent (w/w) sulfur loading until the mixture was uniform. This mixture was then heated at 150° C. for 90 minutes.

A dry air stream, having an inlet mercury concentration of 22,700 μg/m$^3$ was passed through a column containing the above-described sulfur impregnated CMX-1, at a linear velocity of 23 ft/min. The column and inlet air stream were maintained at a temperature of 44° C. and ambient pressure. A contact time of 8 seconds was sufficient to reduce the mercury vapor concentration to 0.014 μg/m$^3$. The results are presented in FIG. 1.

Example 5

The carbon molecular sieve of Example 1 was mixed, at 150° C., with a sufficient quantity of sublimed elemental sulfur to provide a 10 percent (w/w) sulfur loading until the mixture was uniform. This mixture was then heated at 150° C. for 45 minutes and at 165° C. for an additional 45 minutes.

A dry air stream, having an inlet mercury concentration of 21,200 μg/m$^3$ was passed through a column containing the sulfur impregnated coconut char, at a linear velocity of 23 ft/min. The column and inlet air stream were maintained at a temperature of 44° C. and ambient pressure. A contact time of 8 seconds was sufficient to reduce the mercury vapor concentration to 0.008 μg/m$^3$. The results are presented in FIG. 1.

Example 6

Dry air, having a high mercury vapor concentration, was passed through the carbon molecular sieve of Example 1 impregnated with sulfur (5 percent sulfur loading, impregnated at 150° C. for 90 minutes heating time) at ambient pressure and temperatures of 20° C. and 42° C. Ports situated along the length of the column were sampled to determine the mercury vapor concentration in the air after known contact times with the adsorbent. The linear flowrate of the air ws 23 ft/min.

The above procedure was repeated at 18° C. and 42° C. with the sulfur impregnated carbon molecular sieve of Example 1 being replaced with Union Carbide 1/16 mole sieve (a sulfur impregnated zeolite mercury adsorbent).

Figure 2:
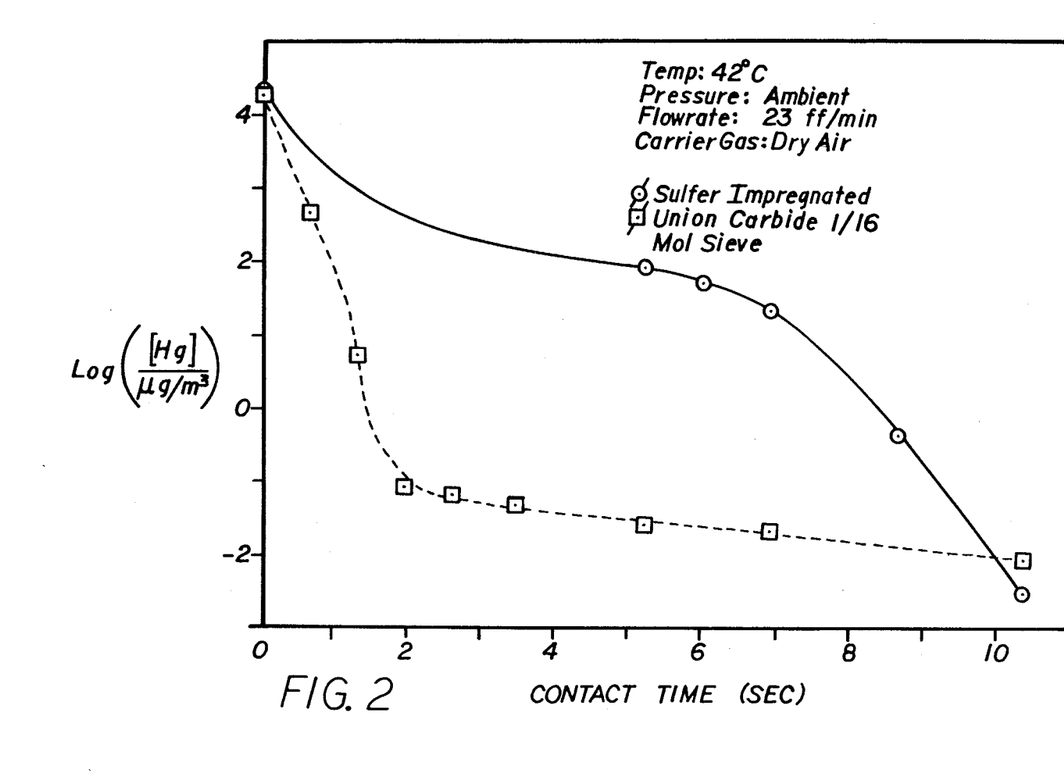
FIG. 2 is a two curve plot of the performance data, using the identical coordinates seen in FIG. 1, comparing an exemplary impregnated C.M.S. of Example 6 with a sulfur impregnated zeolite adsorbent of the prior art as its mercury vapor removal limit.

Results (FIG. 2) obtained at 42° C. show the mercury vapor removal limit of the sulfur impregnated zeolite (0.008 μg/m$^3$) to be inferior to that of the sulfur impregnated Example 1 carbon (0.003 μg/m$^3$). It should also be noted that the removal limit of the carbon molecular sieve does not appear to be highly dependent on the mercury partial pressure.

Figure 3:
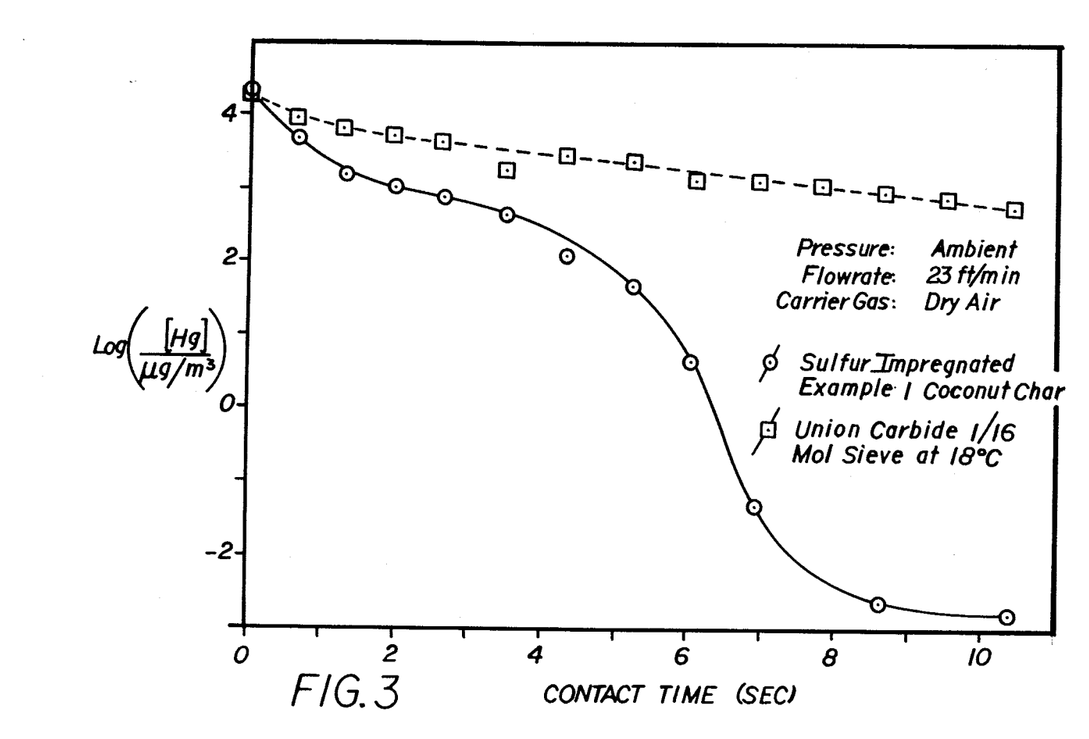
FIG. 3 is a two curve plot of the performance data, using the identical coordinates seen in FIG. 1, but with the airstream at an appreciably lower temperature than in Example 6, comparing the performance of the same impregnated C.M.S. material with the same impregnated zeolite material of Example 6.

Results (FIG. 3) obtained at lower temperatures (18° and 20° C.) show the Union Carbide mole sieve (at 18° C.) to be ineffective due to very poor mercury vapor removal kinetics. The sulfur impregnated coconut char has a mercury vapor removal limit of <0.002 μg/m$^3$ at a nearly equivalent temperature (20° C.).

Example 7

Dry air, having a high mercury vapor concentration, was passed through a column containing the carbon molecular sieve of Example 1 impregnated with sulfur (5 percent sulfur loading, impregnated at 150° C., followed by heating at 150° C. for 90 minutes) at a linear flowrate of 23 ft/min. Pressure and temperature were ambient. Ports situated along the length of the column were sampled to determine the mercury vapor concentration in the air after known contact times with the adsorbent.

This procedure was repeated with H$_2$O saturated air replacing the dry air. The H$_2$O saturated air stream had been passed through the column for 16 hours before analysis was performed.

Both of the above procedures were repeated with sulfur impregnated GRC-II (15 percent w/w sulfur, impregnated at 150° C. followed by heating at 150° C. for 90 minutes) replacing the sulfur impregnated coconut char described above.

GRC-II is a coconut shell-based carbon. GRC-II is an activated carbon. As expected, the mercury vapor removal limit is the same for both carbons (FIG. 4) for dry adsorber beds.

Figure 4:
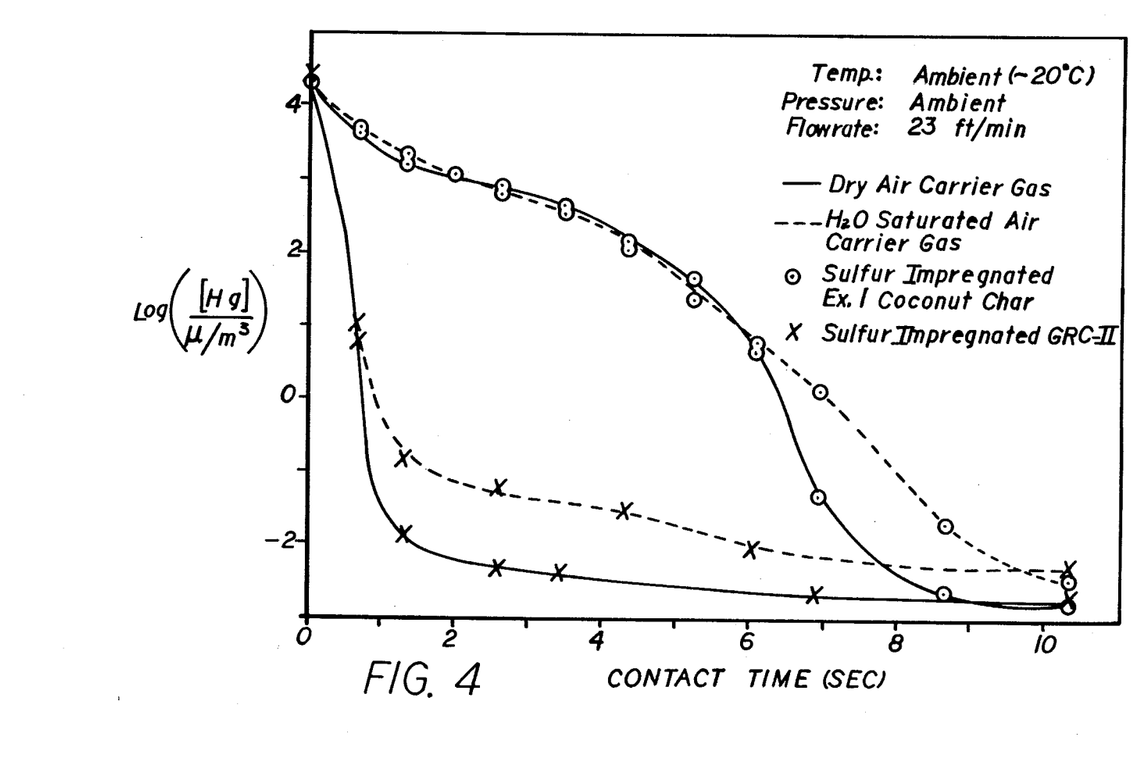
FIG. 4 is a multicurve plot of measured performance data, using the identical coordinates of FIG. 1, comparing the impregnated C.M.S. material of Example 7 with a sulfur impregnated, coconut shell-based, activated carbon (herein GRC-11 carbon), and the effect of $H_2O$ saturated air carrier gas.

As may be seen in FIG. 4, the mercury vapor removal limit of the sulfur impregnated GRC-II is severely affected by adsorbed H$_2$O, while that of the sulfur impregnated coconut char is less severely affected due to its pore size being so constricted as to inhibit easy adsorption of H$_2$O.

Example 8

Figure 5:
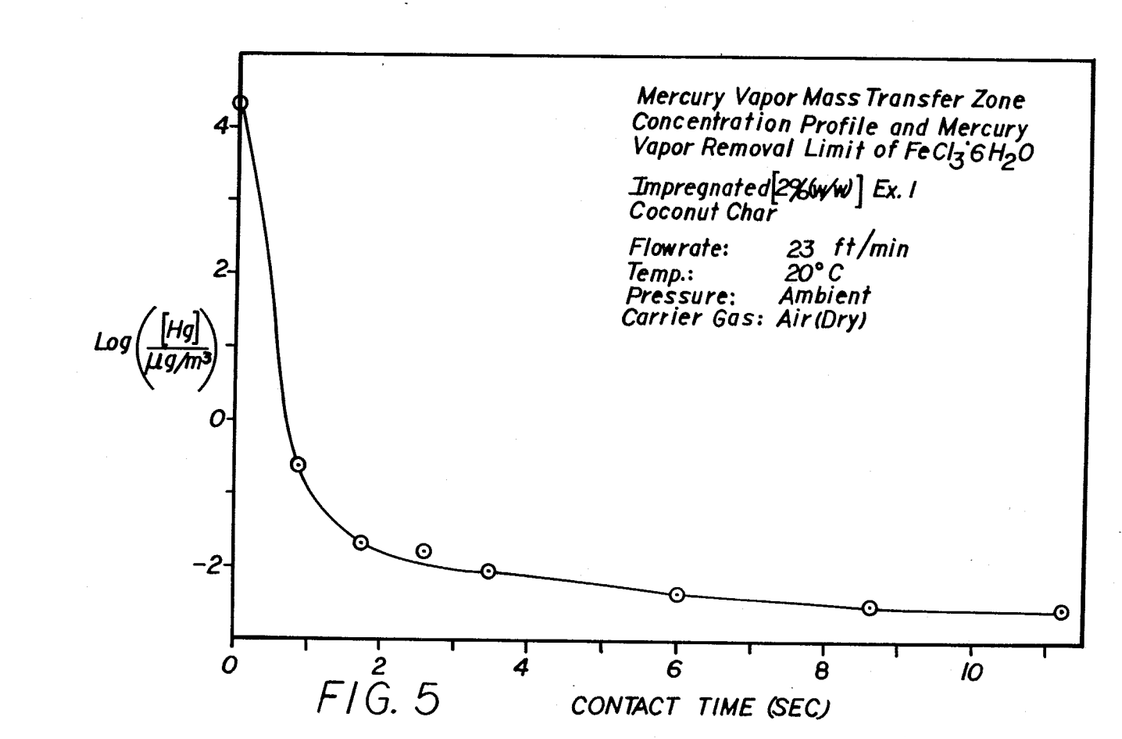
FIG. 5 is a single curve plot of performance data, using the identical coordinates of FIG. 1, of another exemplary CMS material of Example 8, using ferric chloride hydrate as the sieve impregnating agent.

The carbon molecular sieve of Example 1 was sprayed with an aqueous solution of ferric chloride (14 g of FeCl$_3$.6H$_2$O, 100 ml of H$_2$O, 700 g CMX-1). The resulting damp carbon was air dried several days. The impregnated carbon was placed in a column through which mercury vapor saturated air was passed at 20° C. Ports situated along the length of the column were sampled to determine the mercury vapor concentration in the air after known contact times with the adsorbent. The linear flow rate of the air was 23 ft/min. Results are presented in FIG. 5.

Example 9

Figure 6:
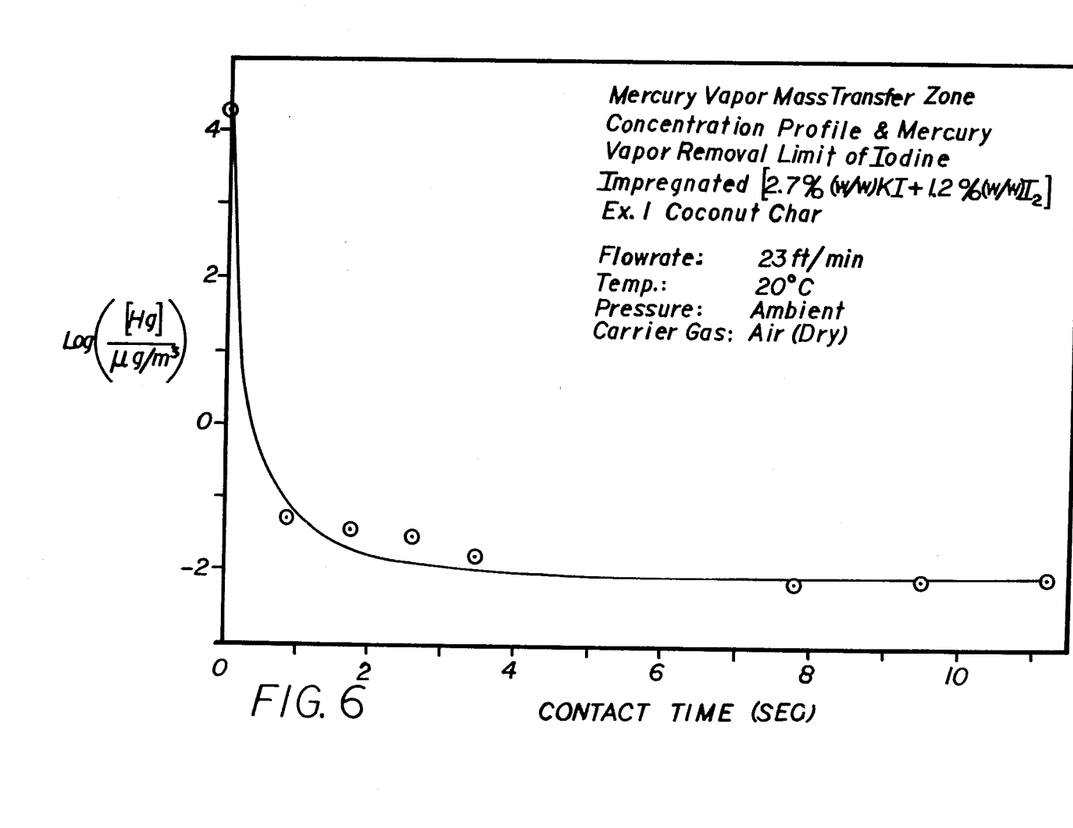
FIG. 6 is a single curve plot of performance data, using the identical coordinates of FIG. 1 of another exemplary CMS material of Example 9, using an alkali metal triiodide salt as the impregnating agent.

The carbon molecular sieve of Example 1 was sprayed with an aqueous solution of potassium triiodide (19.0 g KI, 8.5 g I$_2$, 300 cc H$_2$O, 700 g CMX-1). The resulting damp carbon was air dried several days. The impregnated carbon was placed in a column through which mercury vapor saturated air was passed at 20° C. Ports situated along the length of the column were sampled to determine the mercury vapor concentration in the air after known contact times with the adsorbent. The linear flow rate of the air was 23 ft/min. Results are presented in FIG. 6.

Example 10 (Comparison Example)

Figure 7:
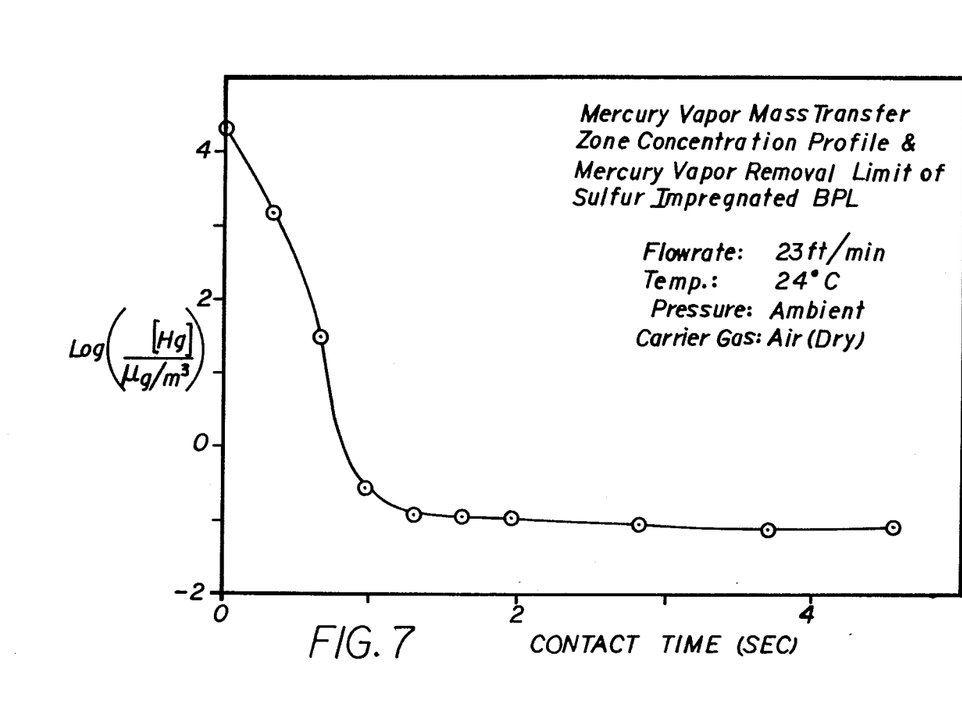
FIG. 7 (comparison example 10) is a single curve plot of performance data, using the identical coordinates of FIG. 1, of a coal-based activated carbon, using sulfur impregnation (herein called modified BPL carbon) of the prior art.

Dry air, having a high mercury vapor concentration, was passed through BPL, a coal-based activated carbon, [impregnated with 15 percent (w/w) sulfur, manufactured by Calgon Carbon Corporation, Pittsburgh, Pa.] at 24° C. and ambient pressure. Ports situated along the length of the column were sampled to determine the mercury vapor concentration in the air after known contact times with the adsorbent. The linear flow rate of the air was 23 ft/min. Results (FIG. 7) show the mercury vapor removal limit of HGR to be 0.071 $\mu g/m^3$ under these conditions.

Example 11

MSC-V (a commercial slightly-activated, coal-based, molecular sieve carbon, manufactured by Calgon Carbon Corporation, Pittsburgh, Pa.) was mixed at 150° C. with a sufficient quantity of sublimed elemental sulfur to provide a 5 percent (w/w) sulfur loading until the mixture was uniform. This mixture was then heated at 150° C. for 90 minutes.

Figure 8:
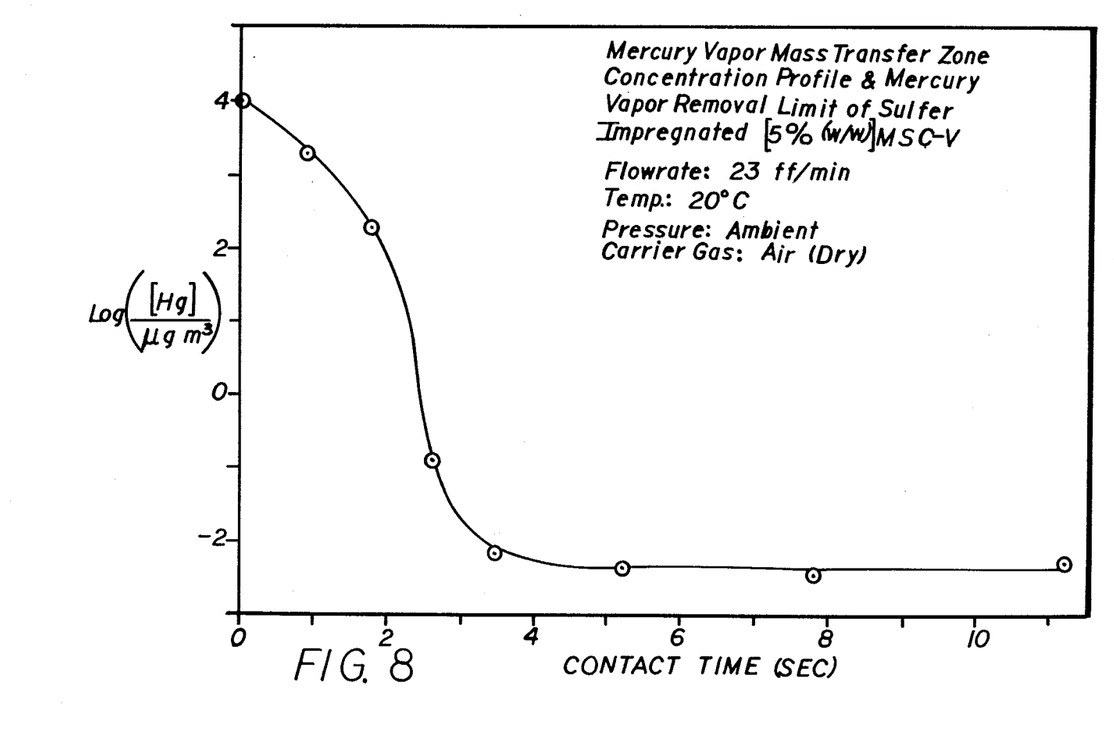
FIG. 8 is a single curve plot of performance data, using the identical coordinates of FIG. 1, of another CMS material, impregnated with sulfur, initially slightly-activated, then per Example 11 (herein MsC-V grade of CMS)

Dry air, having a high mercury vapor concentration, was passed through the sulfur impregnated MSC-V at 20° C. and ambient pressure. Ports situated along the length of the column were sampled to determine the mercury vapor concentration in the air after known contact times with the adsorbent. The linear flow rate of the air was 23 ft/min. Results (FIG. 8) show the mercury vapor removal limit of the sulfur impregnated MSC-V to be 0.004 $\mu g/m^3$.

Example 12

Calcined babassu nut char (10×30 mesh, calcined at 950° C.) was mixed at 150° C. with a sufficient quantity of sublimed elemental sulfur to provide a 5 percent (w/w) sulfur loading until the mixture was uniform. This mixture was then heated at 150° C. for 90 minutes.

Figure 9:
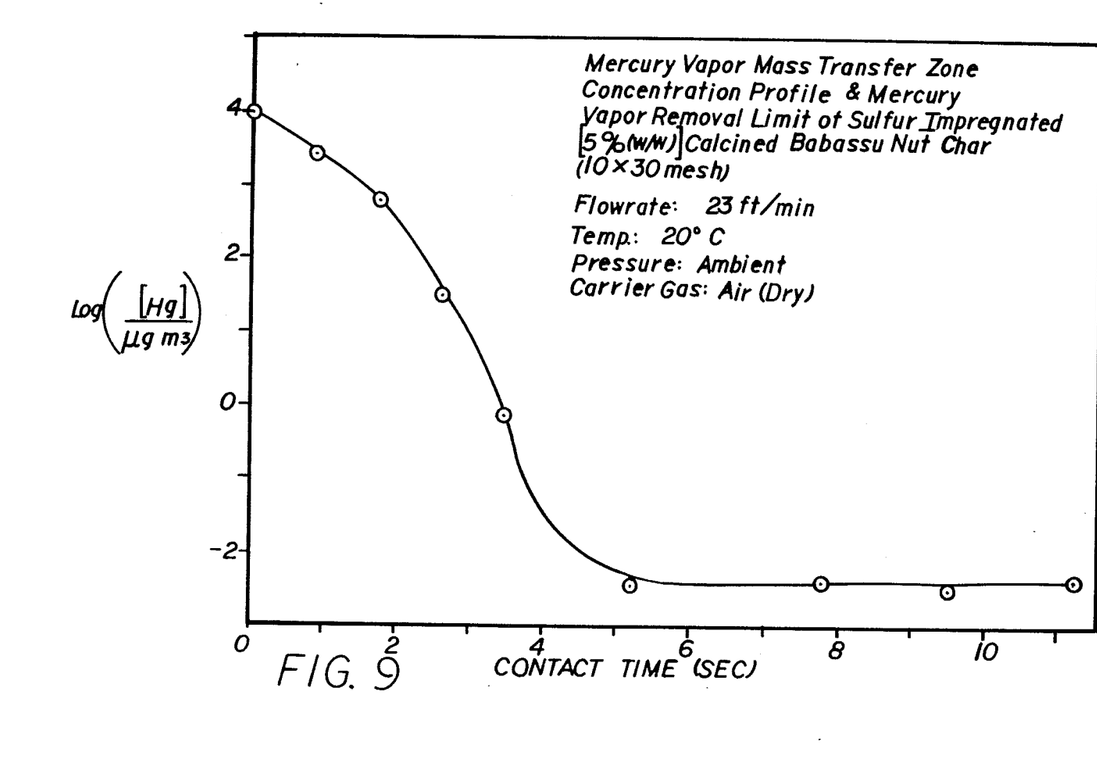
FIG. 9 is a single curve plot of performance data, using identical coordinates of FIG. 1, of a babassu nut char-based molecular sieve carbon, immpregnated with sulfur (herein MSC-V)

Dry air, having a high mercury vapor concentration, was passed through the sulfur impregnated calcined babassu nut char at 20° C. and ambient pressure. Ports situated along the length of the column were sampled to determine the mercury vapor concentration in the air after known contact times with the adsorbent. The linear flow rate of the air was 23 ft/min. Results (FIG. 9) show the mercury vapor removal limit of the sulfur impregnated MSC-V to be 0.004 $\mu g/m^3$.

Example 13

Bergbau molecular sieve, a coal-based carbon molecular sieve (manufactured by Bergbau Forshung), was mixed at 150° C. with a sufficient quantity of sublimed elemental sulfur to provide a 5 percent (w/w) sulfur loading until the mixture was uniform. This mixture was then heated at 150° C. for 90 minutes.

Figure 10:
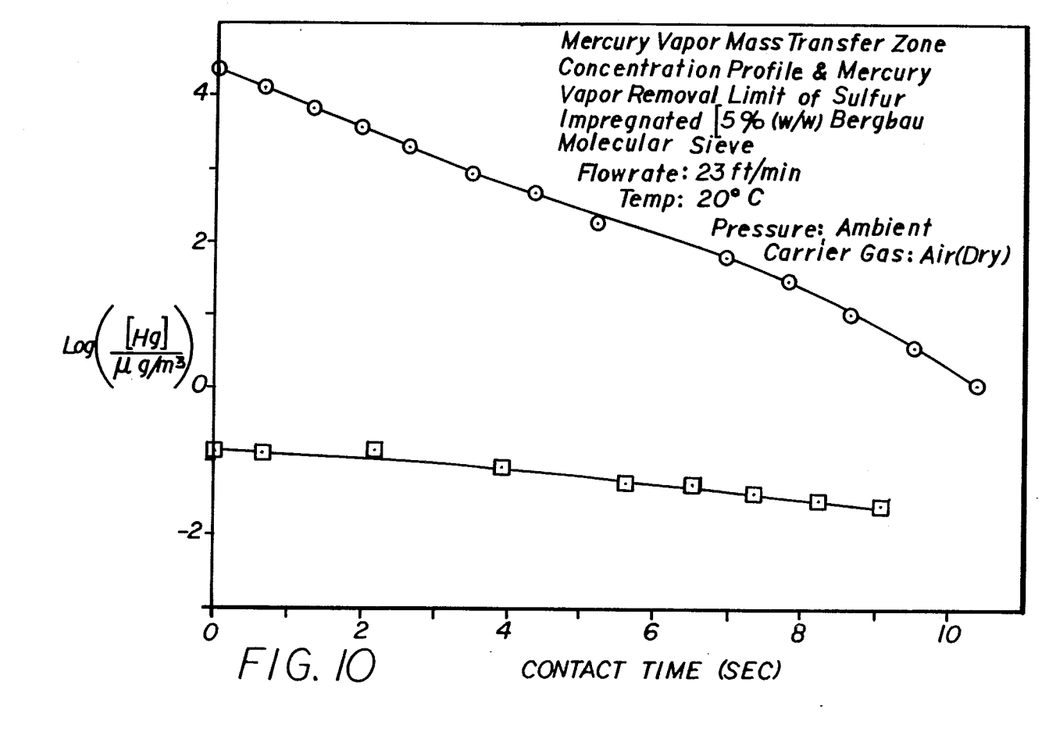
FIG. 10 is a two curve plot of performance data, using the identical coordinates of FIG. 1, of another CMS material, impregnated with sulfur, reflecting the effect on mercury removal of the entry concentration of mercury vapor in the airstream into the absorbent zone.

Dry air, having a high mercury vapor concentration, was passed through the sulfur impregnated Bergbau molecular sieve at 20° C. and ambient pressure. Ports situated along the length of the column were sampled to determine the mercury vapor concentration in the air after known contact times with the adsorbent. The linear flow rate of the air was 23 ft/min. Results (FIG. 10, upper line) show the mercury vapor removal kinetics of this sulfur impregnated carbon to be extremely slow. A mercury vapor removal limit was not reached within the column length. When the inlet mercury vapor concentration was reduced (FIG. 10, lower line) the mercury vapor removal kinetics were further slowed. A mercury vapor removal limit appears to be reached at valued slightly less than 0.025 $\mu g/m^3$ for any practicle contact time.

What is claimed is:

1. A carbon molecular sieve for removing mercury vapor from gas streams, having a nitrogen diffusivity of less than $2600 \times 10^{-8}$ cm$^2$/second, impregnated with from about 0.005 to about 15%, by weight, of a mercury reactive material, wherein said carbon molecular sieve is effective at mercury vapor concentrations less than $4 \times 10^{-6} \times P_s$, where $P_s$ is the mercury vapor saturation pressure at a given pressure and temperature.

2. The carbon molecular sieve of claim 1, wherein the mercury reactive impregnant level is from about 0.01 to about 10 weight percent.

3. The molecular sieve of claim 1, wherein the mercury reactive impregnated level is from about 3 to about 7 weight percent.

4. The carbon molecular sieve of claim 1, wherein said mercury reactive material is sulfur or sulfides.

5. The carbon molecular sieve of claim 1, wherein said carbon molecular sieve is selected from the group consisting of coconut shell char, babassu nut char and coal char.

6. The carbon molecular sieve of claim 1, having a nitrogen diffusivity of $10 \times 10^{-8}$ cm$^2$/second to $2600 \times 10^{-8}$ cm$^2$/second.

7. A process for removing mercury vapor from gas streams which comprises passing a gas stream containing mercury vapor into contact with a carbon molecular sieve, having a nitrogen diffusivity of less than $2600 \times 10^{-8}$ cm$^2$/second, impregnated with from about 0.005 to about 15 percent, by weight, of a mercury reactive material, wherein said carbon molecular sieve is effective at mercury vapor concentrations less than $4 \times 10^{-6} \times P_s$, where $P_s$ is the mercury vapor saturation pressure at a given pressure and temperature.

8. The process of claim 7, wherein the gas stream is natural gas.

9. The process of claim 7, wherein the gas stream is air.

10. The process of claim 7, wherein prior to contacting the gas stream with said mercury reactive impregnated carbon molecular sieve, said gas stream is first brought into contact with a carbon impregnated with a mercury reactive material.

11. The process of claim 7, wherein prior to contacting the gas stream with said mercury reactive impregnated carbon molecular sieve, said gas stream is first brought into contact with a zeolite molecular sieve impregnated with a mercury reactive material.

12. The process of claim 7, wherein said carbon molecular sieve has a nitrogen diffusivity of $10 \times 10^{-8}$ cm$^2$/second to $2600 \times 10^{-8}$ cm$^2$/second.

* * * * *